United States Patent

Levering

[15] 3,694,018

[45] Sept. 26, 1972

[54] ELASTOMERIC IMPACT ENERGY DISSIPATOR

[72] Inventor: David R. Levering, Cincinnati, Ohio

[73] Assignee: General Motors Corporation, Detroit, Mich.

[22] Filed: July 22, 1970

[21] Appl. No.: 57,214

[52] U.S. Cl. .................................293/88, 267/140
[51] Int. Cl. ...........................B60r 19/06, F60f 1/36
[58] Field of Search ..267/140, 141, 63, 153; 293/85, 293/88

[56] References Cited

UNITED STATES PATENTS

| 3,514,144 | 5/1970 | Alderfer | 293/71 R |
| 3,507,123 | 4/1970 | Miura | 61/48 |
| 1,655,777 | 1/1928 | Weiland | 293/88 |

FOREIGN PATENTS OR APPLICATIONS

| 658,945 | 6/1929 | France | 293/85 |
| 1,116,719 | 5/1956 | France | 267/63 |
| 1,145,861 | 3/1963 | Germany | 267/63 |

Primary Examiner—Gerald M. Forlenza
Assistant Examiner—Robert Saifer
Attorney—W. E. Finken and D. L. Ellis

[57] ABSTRACT

The illustrative exemplary embodiment incorporates the elastomeric impact energy dissipating body as a bumper mount connecting an automotive vehicle collision bumper bar to the vehicle frame. The dissipator is constructed of high density polyurethane or like material having the properties of high modulus of elasticity and high tensile elongation. The dissipator has a cross sectional shape generally of rectangular tubular configuration including elongated columnar wall elements adapted to undergo laterally outward buckling under impact compression loading therein and a tensile web extending laterally between the columnar elements operative to resist the buckling up to a predetermined value, to provide large amounts of energy dissipation along with the remainder of the body during the buckling, and to elastically return the body and the supported bumper bar to its original condition following release of the impact forces.

4 Claims, 7 Drawing Figures

PATENTED SEP 26 1972 3,694,018

INVENTOR.
David R. Levering
BY
D. L. Ellis
ATTORNEY

PATENTED SEP 26 1972

INVENTOR
David R. Levering
BY
D. L. Ellis
ATTORNEY

ELASTOMERIC IMPACT ENERGY DISSIPATOR

This invention relates to energy dissipators and more particularly to energy dissipating devices suitable for use in automotive vehicle collision bumpers and similar installations requiring substantial impact energy dissipation followed by self-restoration of the device to a normal condition operative for repeated such impacts and energy dissipation.

Desirable features of energy dissipators suitable for energy absorbing automotive bumper installations and the like have been that the energy dissipator sustain or absorb large amounts of the kinetic energy occurring in the input excursion of the device under impact and that it not rebound or return substantially all of such energy in its original form to the impacted object following the occurrence as would normally be the case in the examples of completely elastic coil spring devices, compressible air spring devices and the like. In addition to this requirement of true energy dissipation or irreversible absorption, there is often the somewhat incongruous requirement that the device be self-restoring, i.e., the device return itself and the collision bar or other impacted object to its original condition so as to receive additional impact energy and not be limited to so-called "shot" operation requiring replacement of the energy dissipating modules or units.

The primary object of this invention is to meet these several criteria in a device of relatively low cost and utmost simplicity through the effective use of the viscoelectric properties of elastomeric materials.

A further object of this invention is to provide such an elastomeric energy dissipator suitable for use in energy absorbing automotive bumper installations and the like wherein the dissipator is not only effective for the energy dissipation functions above set forth, but also is structurally sufficient to provide support for the bumper on the vehicle body satisfactorily in normal use conditions.

As a principal feature, the energy dissipating device of the invention takes the form of a body of elastomeric material such as a high density polyurethane or rubber having the properties of high stiffness or high modulus of elasticity and high elongation and being formed in a generally rectangular tubular cross-section in which the tubular side walls are comprised of a pair of columnar elements and a pair of integrally associated base elements, with one or more tensile straps or webs being connected integrally between the columnar elements to resist a predisposed outward buckling thereof. With the device aligned to have the columnar elements extend in the direction of expected impact the tensile web, in concert with certain factors of the shaping of the columnar elements themselves, dictates a force level at which the device will begin to deflect and undergo an energy absorbing excursion. Upon reaching such value, an outward buckling of the columnar elements causes the device to foreshorten along the axis of the applied force and expand laterally outwardly in such a manner as to predictably elongate the tensile web. The viscoelastic properties of the material of the tensile web, in concert with the same effects in the material of other sections of the device to a lesser degree, provides substantial true energy dissipation without rupturing of the device. Following the release of the predetermined impact force, however, the device retains sufficient elasticity only to efficiently restore itself to its original condition, without violent rebound, so as to be ready for operation in repeated impacts.

As a further feature, the device is made of sufficient thickness as to partake of the material stiffness of the particular elastomer so that, through the use of a selected number of such devices, they provide the required primary support of the collision bumper on the vehicle.

The foregoing and other objects, features and advantages of the invention will be readily apparent from the following specification and from the drawings wherein.

Figure 1:
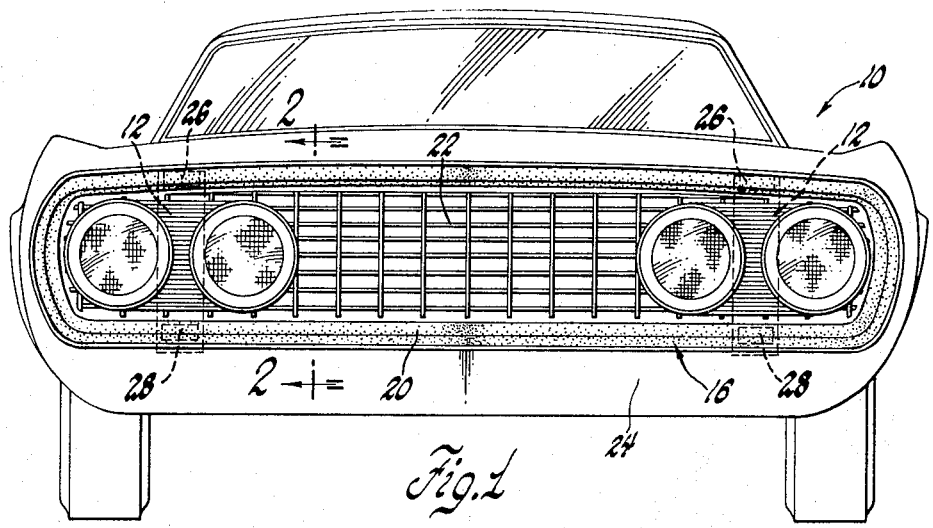
FIG. 1 is a front elevational view of a vehicle body having a collision bumper bar installation including the energy dissipating device of the present invention.
Figure 6:
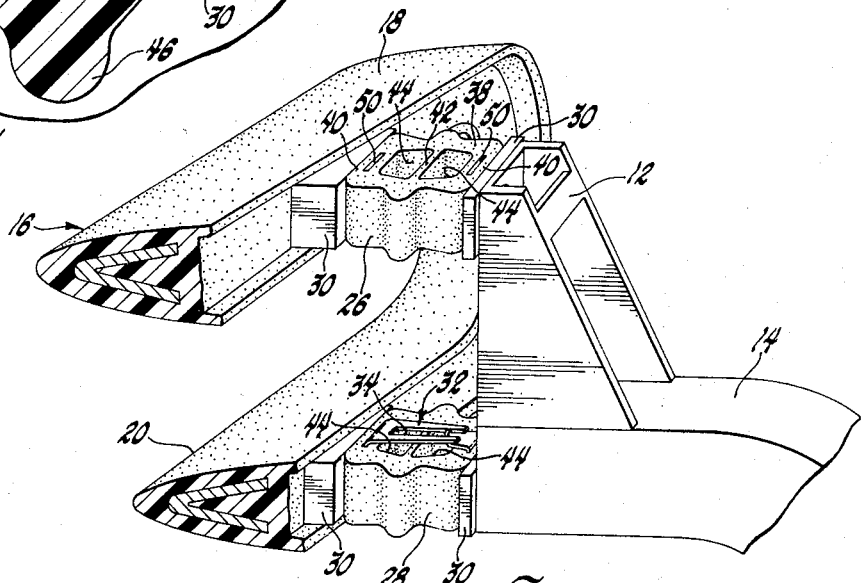
FIG. 6 is a partial perspective view of the collision bumper bar installation.

Referring now particularly to FIG. 1 of the drawings, there is illustrated the front end portion of a vehicle body designated generally as 10 which includes a chassis frame or subframe of conventional character but provided with a pair of terminal end towers 12, best seen in FIG. 6. These towers are integrally associated with the vehicle longitudinal frame rails 14 and may be further associated with a lateral cross-member, not shown. It is to be understood that while the drawings illustrate a separate chassis frame, the invention is equally well applied, in the case of these bumper installations, to vehicles employing unibody construction.

In the exemplary vehicle bumper installation, there is included a generally oval-shaped in elevation bumper or collision bar 16 including upper and lower transverse portions 18 and 20 which help to define, as illustrated, an oval grille opening for exposing a vehicle grille structure 22 affixed to the front end sheet metal portion of the vehicle. As viewed in FIGS. 1 and 2, bumper 16 is enveloped at its rearward margins by the front end sheet metal of the vehicle including the two front fenders, the hood and the lower splash shield 24 in such a manner as to permit telescoping of bumper 16 into the front end sheet metal without interference during the application of collision forces sufficient to bring the energy absorbing functions of the dissipator of this invention into play. Bumper 16 may be fabricated of a composite construction including an inner steel backbone having molded thereover a high density but foam-like self-skinning polyurethane or other desired elastomer capable of sustaining minor bumps and abrasions without damage.

Figure 2:
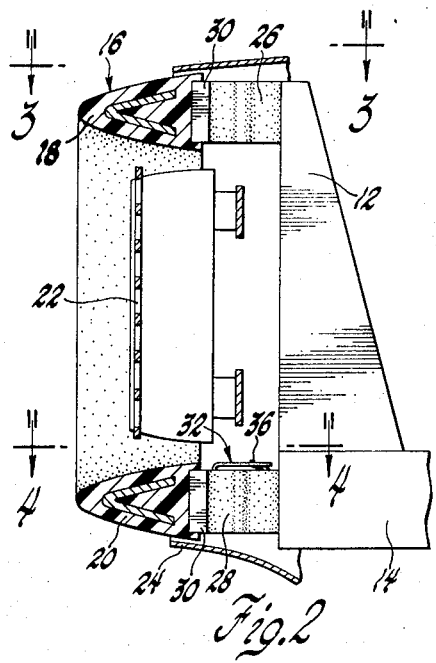
FIG. 2 is an enlarged vertical sectional view taken generally along the plane indicated by lines 2—2 of FIG. 1.

Referring now more particularly to FIGS. 2 and 6, the bumper 16 is rigidly mounted on frame towers 12 by a set of four energy dissipators constructed in accordance with this invention, the upper pair of dissipators being designated as 26 and the lower pair 28. With both pairs, suitable mounting plates or flanges 30 are formed on bumper 18 and towers 12 to provide flat engagement surfaces suitable for center bolting as at 31 of the base portions of the dissipators, soon to be described, flushly thereto in uniform load bearing engagement completely across the base portions. The upper and lower pairs of dissipators 26 and 28 are generally identical except that, as illustrated, the lower pair may be provided with a guidance mechanism 32 including a pair of generally L-shaped plates each having one leg thereof embedded in the elastomeric dissipator as molded, and having the other leg thereof extend over the top surface of the dissipator into a mating engagement with the other plate. One plate carries a slot 34, best viewed in FIG. 3, receiving an up-turned tab 36 on the other plate. The interlocking engagement between the plates afforded thereby dictates that the dissipators deflect or deform in a direction extending longitudinally of the body so that, in the event of cornering impacts or like forces causing displacement of bumper 16 tending toward a path angularly disposed to such a longitudinal direction, the guidance mechanism reacts the tendency and forces it in the longitudinal path. Alternatively to such plates, swinging links or panhard rods may be employed between the frame and bumper to restrict lateral motion of the latter.

Figure 3:
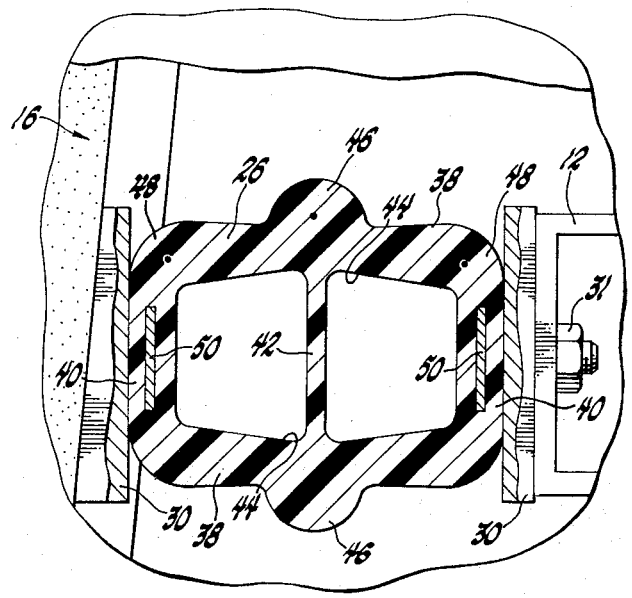
FIG. 3 is an enlarged view taken along the lines 3—3 of FIG. 2 showing the dissipator in normal condition.
Figure 4:
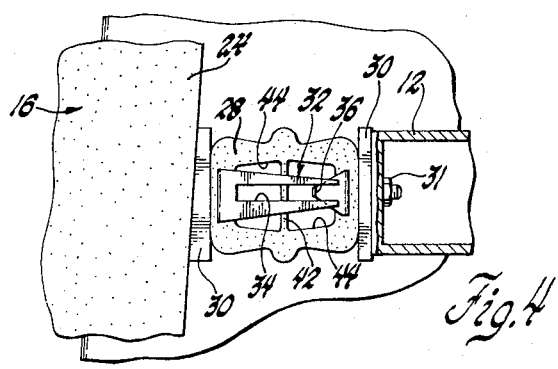
FIG. 4 is a view similar to FIG. 3 taken along the lines 4—4 of FIG. 2.
Figure 5:
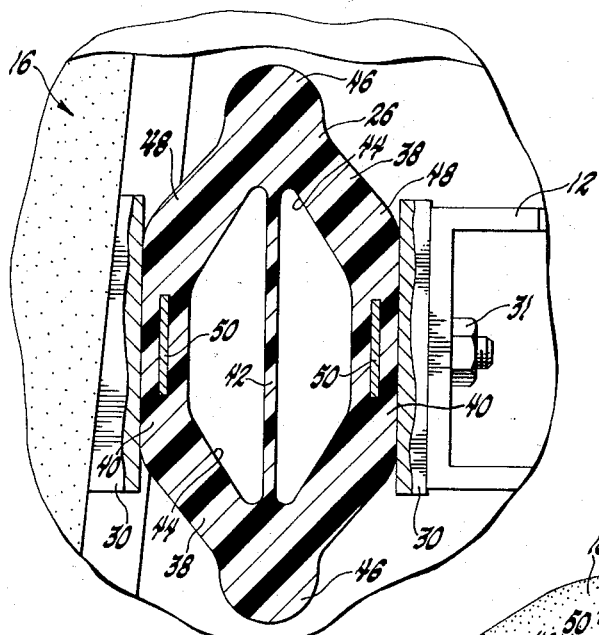
FIG. 5 is a view similar to FIG. 3 showing the dissipator and bumper bar in a deflected condition.

FIGS. 3 and 5 illustrate the nature of the deflection or energy absorbing excursion resulting from the configuration or shaping factors of the dissipators 26 and 28. As indicated in FIG. 2, each dissipator as molded or fabricated in normal condition has generally the form of a rectangular tubular body including elongated side wall columnar elements 38 and base elements 40 integrally connected with the columnar elements. The preferred form of dissipator includes a single tensile strap or web 42 extending integrally from one columnar element 38 to the other at points generally midway their length. Such web is seen as being defined thusly by two tube defining cavities 44 which are aligned along one axis of the dissipator and spaced symmetrically either side of the other axis thereof so that the dissipator effectively comprises two U-shaped bodies set one atop the other and joined in the regions 46. The columnar elements 38, which are made up of the legs of the two U-shaped bodies, are so shaped as to have a predisposition or preformed tendency toward instability in a laterally outward or mutually separating direction when compressive load is applied to the dissipator along the longitudinal centerline of the device parallel the elements 38.

In closer terms, the dissipator may be viewed as an elastomeric body which is sufficiently rigid to perform through its various portions substantially like a linkage made up of a pair of links in each columnar element 38 extending from corner primary hinge areas 48 at each end of the two columnar elements 38 and joined at a central primary hinge area constituted by the juncture regions 46. In FIG. 3, the designation of points within regions 46 and 48 has reference to the centroids of these localized mass regions. In the central hinge areas 46, it is seen that the preferred embodiment employs local enlargements with preformed outward bulge whereby the centroids 46 of such area are located each laterally outwardly of the two adjacent centroidal locations in corner regions or areas 48. Accordingly, any compressive loading applied across the width of base 40 and naturally concentrated largely to act longitudinally through the columnar elements 38 will, by virtue of force equilibrium through the columnar elements 38 will, by virtue of force equilibrium through the laterally spaced centroids of areas 46 and 48, cause these columnar elements 38 to have a predisposition to laterally outward buckling.

Such outward buckling is resisted by the web 42 acting in tension. The web thus imparts column stability to columnar elements 38 in compression and by suitable sizing of the thickness of the web in conjunction with the selection of centroid location in areas 46 and 48, the load at which the columnar elements will buckle or fold may be easily dictated.

It is to be observed that the predisposition to the laterally outward buckling in elements 38 may be accomplished in other manners of shaping of the elements over their length. It is, however, believed preferable that in any case there be a definite hinge area in the regions 46 midway the length of the columnar elements so that the generally tubular cross section of the dissipator will collapse in a symmetrical manner under impact force in the manner indicated in FIG. 5. In the illustrated embodiment, a single web 42 is shown extending directly between these hinge regions 46 but it should be appreciated that the single web defined by the two cavities 44 might be replaced by two or more webs located differently along the lengths of the elements 38 but still operative to control buckling resistance thereof and permit localized hinging or folding thereof about specific hinge points generally at those shown at 46 and 48.

FIG. 5 illustrates the folding action which takes place in the particular configuration of the dissipator of this invention under compressive loading therein, about the hinge areas 46 and 48 of the columnar portions as shown in the FIG., with base portions 40 remaining relatively undistorted. This lack of base distortion may be accomplished if desired by stiffening members 50 embedded in the base portions, which members aid in the rigid bolt attachment of the dissipators to the vehicle frame and bumper. However, additional energy dissipation may be available from allowing deformation of these base portions in a concave bulging by schemes of rigid attachment of the dissipators in the vehicle other than use of bolts 31 through the central region of the base portions.

The web 42 is seen as having been caused substantial elongation as columnar elements 38 are folded about their hinge points to positions laterally separated to the extent shown in FIG. 5, and to even further extent where the impact forces are at a maximum design level for the dissipator sufficient to bottom the base portions on the web 42. Following release of impact force on bumper 16, elasticity in web 42 and the elasticity directly within the base portions 40 and columnar elements 38 serve to return the dissipator from its folded or collapsed condition, such as indicated in FIG. 5, back to its normal unstressed condition of FIG. 3.

It is to be appreciated also that in addition to the dimensional or shaping considerations leading to predictable buckling load, the lengths of columns 38 and bases 40 are useful in controlling the deflection of the device. Thus, a shorter column and longer base requires less elongation of web 42 into fully flattened condition, but reduces the viscoelastic energy dissipation therefrom. As indicated roughly in the drawings, a column to base length ratio of 1.5 to 1 has proven satisfactory in use with certain elastomeric materials as specified below.

The energy of impact applied to bumper 16 and the several dissipators 26 and 28 is substantially irreversibly absorbed or dissipated through the viscous and viscoelastic properties of the particular elastomeric material which is selected as suitable to particular applications of this invention, examples of which materials are given below. The particular physical configuration of the device of the invention utilizes these effects to maximum advantage. By virtue of the configuration, the elastomeric body will sustain impact force loadings of a very large magnitude which may be predetermined in accordance with the predictable buckling tendencies of columnar elements 38 as above set forth. The buckling is accompanied by a predetermined or predictable amount of deflection in the device particularly the web thereof, as indicated in FIGS. 3 and 5. During the deflection these viscous and viscoelastic properties are focused to become operative for irreversible absorption or dissipation of the energy, yet are dimensionally limited or controlled so as not to cause rupturing of the dissipator device body. Following release of the impact forces, the elastic property of the unruptured dissipator material becomes operative to relatively slowly, without violent rebound from undissipated energy, return the dissipators and bumper 16 to original condition.

Figure 7:
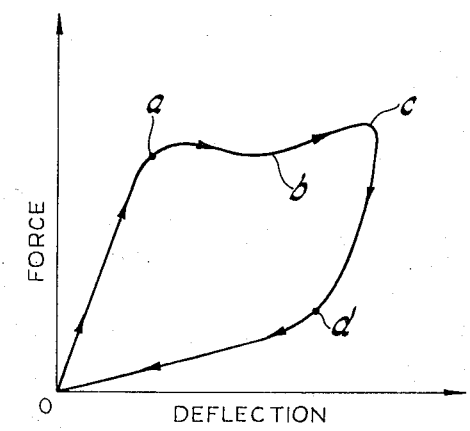
FIG. 7 is a force-deflection graph indicating the operational characteristic of the dissipator.

FIG. 7 is a force deflection graph generally indicating these operational attributes of the device. Beginning at the origin representing the unstressed configuration of FIG. 3, an impact force on bumper 16 applied to an individual dissipator would cause an initial deflection of the dissipator body without buckling due principally to a generally linear rate of elastic compression thereof rising with load until the body experiences the condition represented generally at point a, such point being the force loading at which columnar elements 38 experience the onset of buckling in accordance with the predetermination factors discussed above. By virtue of the tensile resistance supplied by web 42, the outward buckling of elements 38 is accompanied by substantial elongation of the web and the resistance thereto maintains the force level in the device generally at the buckling load until deflection reaches the condition shown at b, whereat the base portions 40 are incipiently bottomed out on web 42 as above described. There follows an additional compression of the entire dissipator body, as between the mounting flanges 30, until point c is reached representing a generally maximum allowable deflection in the device. During such deflection the viscous and viscoelastic properties of the elastomeric dissipator material serve to transform the applied kinetic energy and resulting deflection into material flow and molecular free energy or heat. This transformation or irreversible energy absorption is represented by the generally vertical portion of the curve between points c or d thereon. The energy dissipation takes place principally in web 42 but derives also from the viscous and viscoelastic effects in the primary hinge areas 46 and 48 and to yet lesser degrees in other adjacent portions of the deflected dissipator. There then follows from point d the elastic self-restoration of the dissipator to its original condition due to release of the remainder of the applied energy in the dissipator which has been retained as elastic distortion.

It is of course to be appreciated that the amount of energy dissipated is that which is represented in foot-pounds or like units by the integration of the curve or calculation of the amount of area therewithin. Testing indicates that this energy dissipation can be as high as approximately 75 percent of the energy which has been applied to the dissipator.

The curve shown in FIG. 7 approximates those which result from dynamic testing of the dissipator involving the impacting thereon of a moving body at a speed of up to 6.5 mph. Because of this dynamic or abrupt application of impact energy, the threshold level of dissipator buckling or deflection as at point a is raised considerably above that which would be experienced in a slow or static test. This is believed due to "dynamic strain" or a natural stiffening or increase in the modulus of the material of columnar elements 38 under abruptly applied forces.

In testing of dissipator bodies structured generally in the cross sectional configuration of that shown in FIG. 3, wherein the ratio of the length of columnar elements 38 to the extent of base portion 40 is about 1.5 to 1, it has been found that web 42 will stretch during collapse to about 180 percent of its normal length. This relatively high elongation must of course be accommodated in the selection of the material used along with the desired feature of high stiffness or high modulus of elasticity. In some cases, where it is found that the material provides insufficient elongation property suitable to repetitious impact on the device, the ratio of height to base of this rectangular configuration may have to be reduced.

Materials believed suitable for use in the dissipators in respect of proper modulus of elasticity, tensile strength and elongation include natural rubber, polychloroprene, butadiene-styrene copolymers, butadiene-acrylonitrile copolymers and solid polyurethane polymers. Highly satisfactory results have been found particularly with high density polyurethane material, which produced the dissipation results specified hereinabove during dynamic testing.

Natural and synthetic rubber products offer higher elongation properties suitable to a very large number of impacts and less variation of material properties with temperature, but exhibit less stiffness. Accordingly, the use of rubber material advantageously to the principles of this invention could involve modifications of the cross sectional structure shown in FIG. 3, particularly the addition of stiffening plates of steel or the like molded in situ within columnar elements 38 between each hinge area 48 and its adjacent central hinge area 46 to aid in the desired linkage-like collapse deriving from such relatively stiff columnar elements.

The use of four dissipators has been found to be generally necessary in bumper configurations such as that illustrated but where only a blade-type face or collision bar is used two dissipators may suffice, one at each of the opposite ends of the bumper. The stiffness properties of the solid polyurethane and like materials have been found sufficient to provide the sole support of the bumper on the vehicle frame. To avoid vibration or shake of the bumper 16 on the frame when the vehicle travels rough roads, it has been found advantageous to clamp or compress the dissipators between the frame and bumper with a proper amount of deflection or preload. Where the vehicle to which the dissipators are to be applied is among the heavier models and vertical jacking loads are to be applied directly to the bumper 16 to change a flat tire or the like, it may be desirable to modify the installation of the dissipators so that the bumper is mounted on the frame principally by pivoted brackets or other means, but in such manner as to interpose the dissipators between the bumper and frame in a manner wherein horizontal impact forces are applied to the dissipators.

Having thus described this invention, what is claimed is:

1. A reusable impact energy dissipator for absorbing large amounts of kinetic energy substantially irreversibly followed by self-restoration to an original undeformed shape, said dissipator comprising a tubular body of high density urethane material having the properties of a high modulus of elasticity, high tensile strength and high elongation, said tubular body having at least a pair of cavities extending therethrough and aligned on a longitudinal center plane of said body and defining at each side of said body an elongated columnar portion each integrally connected at its opposite ends with a pair of opposite elongated base portions disposed generally normal to said center plane, the rectangular four corners of intersection between said columnar and base portions defining primary hinge portions for deformation of said body with the centroids of said corner hinge portions being aligned longitudinally and transversely of said body, there being further defined in said body between said cavities at least one tensile web extending with integral connection between said columnar portions across said body generally parallel to said base portions, said columnar portions each having enlarged primary hinge portions midway their length, the centroid of each such primary hinge portion being spaced laterally outward of the two adjacent corner hinge portions so that said columnar elements have least buckling resistance under compression loading in a laterally outward direction whereby under predetermined impact forces applied compressively generally along said center plane said columnar elements fold about the six mentioned primary hinge portions and said body foreshortens thereon and expands outwardly, said cavities being open at each end of said body to prevent compression of any matter therein during reduction of volume of said cavities, said tensile web during such fore-shortening undergoing substantial elongation and irreversible energy dissipating viscoelastic flow within the material thereof without rupture therein and operative upon release of such compression loading to return the body to its undeformed shape, said corner and said enlarged hinge portions also undergoing irreversible energy dissipating viscoelastic flow without rupture during such foreshortening and being operative to return said body to its original undeformed shape following release of said compression loading.

2. The energy dissipator recited in claim 1 wherein said tensile web extends with integral connection between the enlarged hinge portions of said columnar portions, said cavities comprising but two in number one either side of said tensile web.

3. The energy dissipator recited in claim 1 further including stiffening members embodied within said base portions preventing gross distortion of the latter during said foreshortening deformation of said body.

4. In a vehicle including a structural portion adapted for mounting thereon of a collision bumper bar, the combination comprising, a collision bumper bar extending transversely of said vehicle, at least a pair of energy dissipating bumper mounts one disposed at each end of said bumper bar, each said mount comprising a tubular body of high density urethane material having the properties of a high modulus of elasticity, high tensile strength and high elongation, said tubular body having at least a pair of cavities extending therethrough and aligned on a longitudinal center plane of said body and defining at each side of said body an elongated columnar portion each connected at its opposite ends with a pair of opposite elongated base portions disposed generally normal to said center plane, the rectangular four corners of intersection between said columnar and base portions defining primary hinge portions for deformation of said body with the centroids of said corner hinge portions being aligned longitudinally and transversely of said body, there being further defined in said body between said cavities at least one tensile web extending with integral connection between said columnar portions across said body generally parallel to said base portions, said columnar portions each having enlarged primary hinge portions midway their length, the centroid of each such primary hinge portion being spaced laterally outward of the two adjacent corner hinge portions so that said columnar elements have least buckling resistance under compression loading in a laterally outward direction whereby under predetermined impact forces applied compressively generally along said center plane said columnar elements fold about the six mentioned primary hinge portions and said body foreshortens thereon and expands outwardly, said cavities being open at each end of said body to prevent compression of any matter therein during reduction of volume of said cavities, said tensile web during such foreshortening undergoing substantial elongation and irreversible energy dissipating viscoelastic flow within the material thereof without rupture therein and operative upon release of such compression loading to return the body to its undeformed shape, said corner and said enlarged hinge portions also undergoing irreversible energy dissipating viscoelastic flow without rupture during such foreshortening and being operative to return said body to its original undeformed shape following release of said compression loading, a stiffening member embedded in each said base portion, means interconnecting one of said base portions and its stiffening member of each of said mounts on a respective end of said bumper bar, and means interconnecting the other base portion and its stiffening member of each said mount to said vehicle structural portion.

* * * * *